United States Patent [19]

Schröder

[11] Patent Number: 4,649,988

[45] Date of Patent: Mar. 17, 1987

[54] LATENT HEAT STORAGE DEVICE FOR COOLING PURPOSES

[75] Inventor: Johann Schröder, Aachen, Fed. Rep. of Germany

[73] Assignee: U.S. Philips Corporation, New York, N.Y.

[21] Appl. No.: 706,544

[22] Filed: Feb. 28, 1985

[30] Foreign Application Priority Data

Mar. 2, 1984 [DE] Fed. Rep. of Germany ....... 3407684

[51] Int. Cl.[4] .............................................. F28D 21/00
[52] U.S. Cl. ........................................ 165/10; 62/430; 62/437; 62/529; 165/81
[58] Field of Search .................... 165/81, 10, 104.11; 62/430, 437, 529

[56] References Cited

U.S. PATENT DOCUMENTS 4,193,271  3/1980  Honigsbaum ...................... 62/437

Primary Examiner—Albert W. Davis, Jr.
Attorney, Agent, or Firm—Rolf E. Schneider

[57] ABSTRACT

A latent heat-storage device for cooling purposes includes a non-deformable closed container, and a heat-storage medium comprising water or a eutectic aqueous solution of a salt contained in the container. The heat-storage medium expands in volume as its temperature is lowered through its phase transition from fluid to solid. The amount of the heat-storage medium is such that a part of the container volume equals or is slightly larger than the maximum volume expansion of the heat-storage medium during operation of the device. A gas condensing between room temperature and the melting temperature of the heat-storage medium fills the container part at atmospheric pressure and room temperature.

2 Claims, 2 Drawing Figures

LATENT HEAT STORAGE DEVICE FOR COOLING PURPOSES

This invention relates to a latent heat storage device for cooling purposes having a non-deformable closed container which comprises water or a eutectic mixture of water with at least a salt as a storage medium as well as a means for the compensation of volume variations of the storage medium, and of pressure variations in the storage device.

For the storage of latent heat between ±0° C. and approximately −50° C., water and a few eutectic mixtures of water with a salt are particularly readily suitable. These storage media, in contrast with nearly all other substances, expand in the phase transition from fluid to solid by several percent by volume. Another disadvantage is that said volume expansion or increase occurs very non-uniformly and, as described in U.S. Pat. No. 4324287, leads to local bulges. As a result of the additions described in the said United States Patent said non-uniform expansion, however, can be considerably avoided. The expansion in volume of the storage medium, however, does not disappear. The resulting pressure variations occurring in a closed storage container would deform the container already in the first storage cycle and would destroy it if, in addition to the said homogenization additions, suitable measures would not be taken to compensate for said volume variation. In the said United States Patent the expansion in volume is compensated by the use of flexible storage containers.

For certain applications, however, it is required that the shape and the dimensions of the storage container during operation should remain unchanged. As an example is mentioned a machine for the production of ice-cream: a cylindrical storage container filled with a cold storage medium rotates horizontally in the ice-cream mixture and the ice-cream film freezing to the container is stripped off by a stationary scraper sliding over the cylinder surface. The storage container, as a moving part of the machine, must hence be entirely stable as regards shape and dimensions.

The simplest measure for compensation of the volume variation is to leave in the storage container a free space which corresponds to the expansion of the storage medium. Since, however, the air present in the said free space would be compressed to a very high pressure during the expansion of the storage medium, the volume must be larger than the increase in volume of the storage medium. With a double free space the pressure would still rise, for example, to 2 bar. When the free space would be evacuated, the container would be loaded externally by 1 bar excessive pressure. A compromise between the two measures is most favourable. The said pressure differences can then be compensated for by suitable wall thicknesses of the steel container.

Remaining disadvantages of these measures, however, are a. the comparatively large wall thicknesses required by the pressure differences,
b. a storage capacity which is reduced by the amount of the free space,
c. a very poor thermal conductivity in the places of the container where the free space is present.

In the above mentioned example this is disadvantageous especially upon freezing in the freezer compartment and in the initial phase of the ice cream preparation.

The said disadvantages can be removed at least partly by container constructions as they are known from the U.S. Pat. No. 1,380,987 and Published German Application OS No. 2828902. According to these publications the volume variation is compensated for by compression of a concentric hose of rubber, a silicone or other elastic synthetic resin. In this manner atmospheric pressure is substantially maintained in the storage container.

In addition to the still remaining disadvantage of a comparatively large free space (hose+inner volume) new difficulties appear with this measure:

a. a restriction of the keeping qualities and reliability (sealing problem) required by the strong mechanical load and deformation.
b. more difficult cleaning since humidity of the air may condense or, for example, ice-cream mixture may penetrate and freeze in the interior of the hose.
c. a comparatively complicated construction which is susceptible to disturbances.

It is an object of the present invention to provide a simple and reliable measure to compensate for pressure variations which occur by volume expansion of the aqueous latent heat-storage in the phase transition in non-deformable closed storage containers.

According to the invention this object is achieved in that the storage container contains only so much storage medium that a part of the container volume which is equal to or slightly larger than the maximum expansion in volume of the storage medium during operation of the storage device remains free from storage medium at room temperature and is filled at atmospheric pressure with a gas which condenses in the temperature range between room temperature and the melting temperature of the storage medium.

Examples of gases which are suitable according to the invention are:

| | boiling point |
|---|---|
| trichlorofluoromethane (Freon 11) $CCl_3F$ | 23.8° C. |
| 1,2-dichlorotetrafluoroethane (Freon 114) $CClF_2CClF_2$ | 3.5° C. |
| butane $C_4H_{10}$* | −0.4° C. |
| 1,1-difluoro-1-chloroethane (Genetron 142 B) $CH(CH_3)_3$ | −9.2° C. |
| isobutane CH $(CH_3)_3$* | −11.7° C. |

*Butane and isobutane have a low solubility in the aqueous storage media, which must also be taken into account for their use. The Freons and Genetron 142 B on the contrary are substantially insoluble in water.

The invention will now be described in greater detail in connection with the accompanying drawing, in which.

Figure 1:
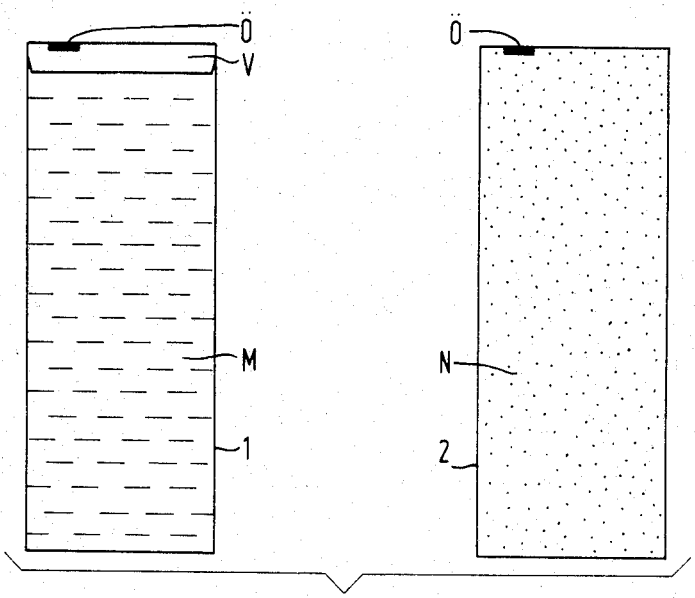
FIG. 1 is a sectional view of a latent heat storage device.
Figure 2:
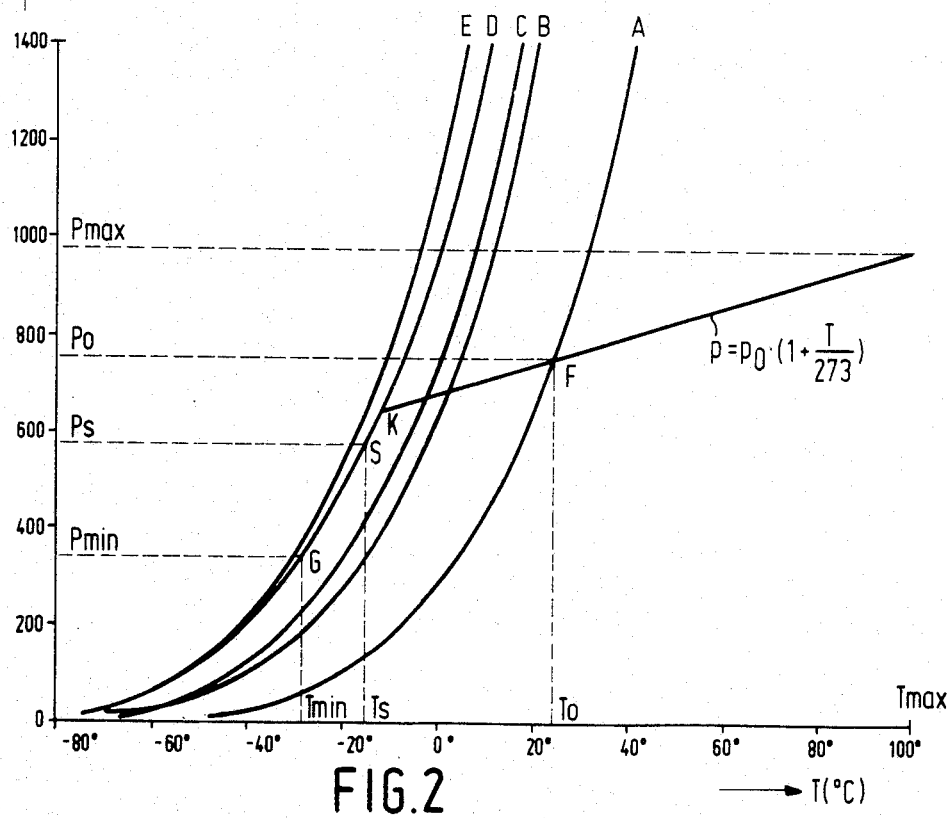
FIG. 2 is a diagram in which the pressure-temperature relationships are shown for the above-mentioned gases.

Reference numeral 1 in FIG. 1 denotes a non-deformable storage container which at room temperature is partially filled with liquid storage medium M and has a gas space V corresponding to the expansion of the storage medium upon phase transition. Reference numeral 2 denotes the same storage container after cooling below the melting temperature and phase transition of the storage medium M. The gas space V in this case is filled entirely with solid storage medium N and the gas has condensed substantially. O are sealed filling apertures In FIG. 2

A = CCl$_3$F trichlorofluoromethane (F 11)
B = C$_2$Cl$_2$F$_4$ 1,2-dichlorotetrafluoroethane (F 114)
C = C$_4$H$_{10}$ butane
D = C$_2$H$_3$ClF$_2$ 1,1-difluoro-1-chloroethane (G 142 B)
E = C$_4$H$_{10}$ isobutane
Tmin
lowest temperature in the freezer compartment
Ts
melting point of the NH$_4$Cl/H$_2$O eutectic solution (19.5% by weight NH$_4$Cl+80.5% by weight H$_2$O)
To    room temperature (filling temperature)
Tmax    highest temperature upon rinsing
Pmin    gas pressure at Tmin
Ps    gas pressure at the melting point
Po    gas pressure at room temperature
Pmax    gas pressure at Tmax.

The relationships which exist in the storage container with such a gas filling will be illustrated with reference to the following example.

In the non-deformable storage container 1 (FIG. 1) with NH$_4$Cl/H$_2$O as the storage medium M, a free space V of 5% is left which was filled with Genetron 142 B at a room temperature of 24° C. and a atmospheric pressure (1013 mbar). In the diagram (FIG. 2) this corresponds to the situation at point F.

When the storage container is now laid in a freezer compartment the gas pressure also decreases with temperature to p=Po. (1+T/273), i.e. by 1/273 per °C., since the volume to a first approximation remains constant. In the diagram this is a movement from point F on the straight line to the left up to point K where the vapour pressure curve D of the Genetron is contacted. From here, upon further cooling, more and more Genetron condenses and the pressure decreases further along the vapour pressure curve of the Genetron.

At point S the actual storage temperature of −16° C. is achieved at which the storage medium (NH$_4$Cl/H$_2$O) freezes. The temperature now remains constant until the whole storage medium has solidified. As a result of the 4.4% expansion of the storage medium in the phase transition the free space decreases from 5% to 0.6%. However, the gas pressure does not vary but a quantity of gas corresponding to the decrease in volume condenses.

Upon further cooling of the fully charged storage container, i.e. of the fully solidified storage medium, the vapour pressure further decreases along the vapour pressure curve of the Genetron until at G a minimum pressure of approximately 4.67 bar is achieved for the conventionally lowest temperatures of freezers.

When after use the storage container is cleaned, it may be exposed, for example, in a rinsing machine, to temperatures of nearly 100° C. for a short period of time. The gas pressure in the free space moves along the straight line p=Po. (1+T/273) to the right and reaches maximally 1.29 bar.

Thus it may be derived from the diagram that the pressure in the storage container itself at 100° C. can rise only be 280 mbar above atmospheric pressure. Upon cooling, the pressure of the Genetron at the melting-point of the NH$_4$Cl/H$_2$O solution of −16° C. still is 758 mbar and remains constant at this value in spite of the drastic decrease in volume. Even at the lowest temperature of approximately −28° C. which may occur in practice still 465 mbar gas pressure remain in the storage container. Per storage container with 1 liter of storage medium approximately 50 cm$^3$ of gas filling are used.

Advantages of the invention are:
a. small pressure variation under operating conditions, enabling use of non-deformable storage container of simple construction and small wall thickness;
b. optimum use of space with correspondingly optimum storage capacity;
c. good and uniform heat transitions.

Only a comparatively small free space of approximately 5% in the melted state remains which upon freezing, however, goes towards 0%.

When this small free space is still to be avoided, the gas may be provided, instead of directly in the free space, into a flexible sysnthetic resin container (for example a rubber or a silicone hose closed at each end) of the same contents as the expansion of the storage medium. This is provided in the storage container (optionally held in the center of the storage device by supports) which is then filled entirely with storage medium and is then closed.

Further examples for suitable latent storage media and their physical data are recorded in the table below. From the stated values for the volume variation the required gas mixture can easily be derived.

Table: latent heat storage medium for cooling purposes (x=melting point; eut=eutectic; s=solid; l=liquid).

| composition | % by weight of salt | melting point °C. | density $D_s$ g/cm$^3$ | (20° C.) $D_l$ g/cm$^3$ | volume variation $V_{l\,s}$ |
|---|---|---|---|---|---|
| Al(NO$_3$)$_3$/H$_2$O | 30.5 eut | −30.6 | 1.251$^x$ | 1.283 | +4.1% |
| NH$_4$F/H$_2$O | 32.3 eut | −28.1 | 1.001$^x$ | 1.096 | +9.4% |
| NH$_4$SCN/H$_2$O | 42.0 eut | −25.5 | 1.065$^x$ | 1.097 | +4.7% |
| KF/H$_2$O | 21.5 eut | −21.6 | 1.168$^x$ | 1.194 | +5.8% |
| NaCl/H$_2$O | 22.4 eut | −21.2 | 1.108$^x$ | 1.165 | +6.4% |
| (NH$_4$)$_2$SO$_4$/H$_2$O | 39.7 eut | −18.5 | 1.166$^x$ | 1.227 | +6.0% |
| NaNO$_3$/H$_2$O | 36.9 eut | −17.7 | 1.211$^x$ | 1.29 | +7.7% |
| NH$_4$Cl/H$_2$O | 19.5 eut | −16.0 | 1.020$^x$ | 1.059 | +4.4% |
| K$_2$HPO$_4$/H$_2$O | 36.8 eut | −13.5 | 1.303$^x$ | 1.357 | +5.1% |
| KCl/H$_2$O | 19.5 eut | −10.7 | 1.052$^x$ | 1.126 | +7.3% |
| ZnSO$_4$/H$_2$O | 27.2 eut | −6.5 | 1.252$^x$ | 1.34 | +7.3% |
| KHCO$_3$/H$_2$O | 16.95 eut | −5.4 | 1.018$^x$ | 1.115 | +9.2% |
| NH$_4$H$_2$PO$_4$/H$_2$O | 16.5 eut | −4.0 | 1.044$^x$ | 1.092 | +4.8% |
| MgSO$_4$/H$_2$O | 19.0 eut | −3.9 | 1.152$^x$ | 1.208 | +5.3% |
| NH$_4$HCO$_3$/H$_2$O | 9.5 eut | −3.9 | 0.992$^x$ | 1.036 | +4.7% |
| NaF/H$_2$O | 3.9 eut | −3.5 | 0.958$^x$ | 1.040 | +8.3 |
| KNO$_3$/H$_2$O | 9.7 eut | −2.8 | 0.992$^x$ | 1.068 | +7.6% |
| Na$_2$CO$_3$/H$_2$O | 5.9 eut | −2.1 | 0.984$^x$ | 1.062 | +7.8% |

What is claimed is:

1. A latent heat-storage device for cooling purposes, which includes a non-deformable closed container; a heat-storage medium comprising water or a eutectic aqueous solution of a salt contained in said container, said heat-storage medium expanding in volume as its temperature is lowered through its phase transition from fluid to solid; the amount of said heat-storage medium being such that a part of the container volume equals or is slightly larger than the maximum volume expansion of the heat-storage medium during operation of the device; and a gas condensing between room temperature and the melting temperature of the heat-storage medium and filling said container part at atmospheric pressure and room temperature.

2. A latent heat-storage device according to claim 1, in which said part of the container volume is filled with trichlorofluoromethane, 1,2-dichlorotetrafluoroethane, butane, 1,1-difluoro-1-chloroethane, and/or isobutane.

* * * * *